3,523,850
PROCESS FOR IMPROVING ADHESION IN A HIGH MOLECULAR WEIGHT POLYETHYLENE - REGENERATED CELLULOSE LAMINATE THROUGH ELECTRICAL DISCHARGE TREATMENT
Russell Thomas Uhline, Richmond, Va., assignor to E. I. du Pont de Nemours and Company, Wilmington, Del., a corporation of Delaware
No Drawing. Filed Mar. 14, 1966, Ser. No. 533,799
Int. Cl. B29b 3/00
U.S. Cl. 156—244
5 Claims

ABSTRACT OF THE DISCLOSURE

A laminate of regenerated cellulose film/polyethylene is produced by applying to an electrically discharge-treated surface of a regenerated cellulose film containing softener and an anchoring agent, a layer of high density polyethylene resin.

---

This invention is concerned with laminar film structures and more particularly with the production of a laminar structure of regenerated cellulose and polyethylene resin films.

In the development of film structures for the packaging of various products, in particular, for the wrapping of fresh meat it has been found that a laminar structure made by coating a regenerated cellulose film containing an anchoring resin with a low density polyethylene resin possesses a desired combination of properties, such as durability, heat sealability, high permeability to oxygen for maintaining the red bloom in meats, and good adhesion between the layers of the laminar structure. Such films have been deficient, however, in optical properties such as haze and gloss, and slip characteristics of the film were such that sheets were somewhat difficult to separate under conditions of use. When a polyethylene resin of improved optical properties has been used for coating the regenerated cellulose film, inferior adhesion between the layers of laminate has resulted.

Accordingly, it is an object of this invention to provide an improved process for the manufacture of a firmly bonded laminar structure of regenerated cellulose film with a polyethylene coating. More particularly, it is an object of this invention to provide a process for the manufacture of a polyethylene coated regenerated cellulose film having strong adhesion between the film layers, and having improved optical and surface slip characteristics.

My invention resides in the discovery of a process for producing a strongly adhered laminar structure of a regenerated cellulose film and a layer of a polyethylene resin which comprises, in combination, the steps of subjecting a regenerated cellulose film, having incorporated therein a softening agent and an anchoring resin, to the action of an electrical discharge between spaced electrodes at substantially atmospheric pressure to the extent of between 0.2 and 12 watt-minutes per square foot of film surface and thereafter applying to the treated surface a layer of polyethylene resin having a density between 0.93 and 0.95, and a melt index between 0.5 and 5.0.

Regenerated cellulose film containing between 15 and 25 percent of glycerol and between 0.1 and 0.4 percent of a conventional anchoring agent, e.g., a melamine/formaldehyde resin, based on the weight of cellulose, is particularly suitable as the substrate or base film. Glycerol may be substituted in whole or in part by any one or a mixture of other known softening agents for regenerated cellulose film, such as propylene glycol, trimethylene glycol, triethylene glycol, hexamethylene glycol, butane diols, etc. The amount of softener may range from 10% to 30% by weight based on the weight of cellulose.

The anchoring agent is usually incorporated in the regenerated cellulose to the extent of between about 0.01 and 1% by weight. Such resins include, in addition to melamine/formaldehyde resins, other heat curable resins such as urea-formaldehyde, guanidine-urea-formaldehyde, and melamine-formaldehyde-polyalkylene polyamide resins.

In place of the low density polyethylene heretofore employed, there is employed for purposes of this invention, polyethylene resin having a density between 0.93 and 0.95, preferably between 0.93 and 0.94; a melt index between 0.5 and 5.0, preferably between 1.0 and 3.0; a maximum haze value of 4.0; and a minimum gloss of 45. Although the polyethylene resin may be applied to the treated surface of the regenerated cellulose base film as a preformed film or as a coating by any convenient technique, it is preferred to extrusion coat molten polyethylene containing between 150 and 300 parts by weight of an antioxidant, and between 200 and 500 parts by weight of a long chain amide such as oleamide, per million parts of resin, at a melt temperature of from 300° to 330° C. and through an air gap of 3 to 6 inches, onto the base film, and thereafter cool the coated film to form a tightly bonded laminate film of polyethylene and regenerated cellulose laminae.

For the electrical discharge treatment of the film in air at atmospheric pressure various treating devices known to the art can be used, a roll and bar type of treater being particularly convenient. Air gaps between the electrodes may be between 10 and 150 mils; insulation may be used on the ground roll to a thickness between 15 and 50 mils. The power source for the electrical discharge treater may be a motor generator, a spark gap oscillator or similar type source for producing a high frequency electrical field between the electrodes. The extent or degree of treatment should be within the range of from 0.2 to 12 watt-minutes per square foot of film surface, with a range of from 0.4 to 5 watt-minutes per square foot of film surface being preferred.

The following example of a preferred embodiment will serve to further illustrate the principles and practice of my invention.

EXAMPLE

Regenerated cellulose film containing 20 percent of glycerin and 0.20 percent of a melamine/formaldehyde resin, based on the weight of the cellulose, is passed between the electrodes of a Lepel High Frequency Spark Generator, Model HFSG, operating at a frequency of about 350,000 cycles per second at 10,000 to 30,000 volts. The resulting film is treated to the extent of 0.5 watt-minute per square foot. Thereafter, an 0.25-mil thick layer of polyethylene resin having a melt index of 2.0, a density of 0.933, containing 250 parts per million of oleamide and 200 parts per million of 2,6-ditertiarybutyl-4-methyl phenol, at a melt temperature of 320° C. is extruded through an air gap of 3 inches, at the rate of 190 feet per minute onto the treated film surface, and the coated film is thereafter cooled to solidify the coating.

The resulting film laminate in sustained production runs shows: (1) heat seal values over 100 grams/1½ inch wide sample on sealing at 180° C./5 p.s.i. pressure/¼ second dwell time; (2) no sloughing of the coating after 10 minutes in boiling water; (3) no peeling of the coating on placing a strip of pressure tape on the coating surface and sharply stripping off the tape; (4) gloss values (ASTM–D523–53T) over 80; and, (5) minimum haze values of approximately 4.0.

By comparison, a laminate made with a polyethylene resin of density 0.917 and melt index of 9.0 shows comparable values for heat seal and comparable behavior on the slough test and peel test but shows a gloss value of about 70 and haze of 5.5, and has poorer slip characteristics than the test film. Laminates made from a regenerated cellulose film containing an anchoring resin but not treated in the electrical discharge and a film without anchoring resin but treated in the electrical discharge show bad sloughing of the coating in the 10-minute boil test and peeling of the coating in the pressure tape test.

What is claimed is:

1. A process for forming a tightly bonded laminate of regenerated cellulose film and polyethylene film, which comprises in combination the steps of subjecting the surface of a base film of regenerated cellulose containing from 10% to 30% by weight of softener, and from 0.01% to 1% by weight of anchoring agent, based on the weight of the cellulose, to the action of an electrical discharge in air at atmospheric pressure to the extent of from 0.2 to 12 watt-minutes per square foot of film surface, and thereafter applying to the resulting treated surface a layer of polyethylene resin having a density within the range of 0.93 to 0.95, and a melt index within the range of from 0.5 to 5.0.

2. The process of claim 1 wherein the layer of polyethylene is melt extruded at a melt temperature between about 300° and about 330° C., and through an air gap of from about 3 to about 6 inches, onto the treated surface of regenerated cellulose to form a continuous coating of polyethylene thereon and the coated film is cooled to solidify the coating.

3. The process of claim 2 wherein the regenerated cellulose film contains from 15% to 25% by weight of glycerol as softener, and from 0.1% to 0.4% by weight of melamine/formaldehyde resin as anchoring agent.

4. The process of claim 2 wherein the extent of treatment is from 0.4 to 5.0 watt-minutes per square foot of film surface.

5. The process of claim 2 wherein the polyethylene resin has a density between 0.93 and 0.94, and a melt index between 1.0 and 3.0.

References Cited

UNITED STATES PATENTS 3,081,214   3/1963   Strome _____ 156—272

JOHN T. GOOLKASIAN, Primary Examiner

J. D. SMITH, Assistant Examiner

U.S. Cl. X.R.

156—272; 161—248, 249; 260—18.3